United States Patent [19]

Seel

[11] 4,265,562
[45] May 5, 1981

[54] LOCKING DEVICE FOR MOUNTING PINS AND THE LIKE

[75] Inventor: Ralph G. Seel, Anderson, S.C.

[73] Assignee: The Singer Company, Stamford, Conn.

[21] Appl. No.: 118,280

[22] Filed: Feb. 4, 1980

[51] Int. Cl.³ ............................................... F16B 7/04
[52] U.S. Cl. ................................... 403/374; 248/410; 292/306
[58] Field of Search ....................... 292/306, 178, 349; 248/410; 403/373, 374

[56] References Cited

U.S. PATENT DOCUMENTS

| 714,661 | 12/1902 | Blaine . | |
|---|---|---|---|
| 779,834 | 1/1905 | Blaine . | |
| 823,324 | 6/1906 | Dunlop . | |
| 936,441 | 10/1909 | Franklin | 292/349 |
| 2,137,748 | 11/1938 | Best | 292/306 UX |
| 2,831,717 | 4/1958 | Mayer . | |
| 2,842,787 | 7/1958 | Murray et al. | 292/306 X |

*Primary Examiner*—Andrew V. Kundrat
*Attorney, Agent, or Firm*—William V. Ebs; Robert E. Smith; Edward L. Bell

[57] ABSTRACT

A locking device for a motor mounting pin extending through the shoulders of support structure is formed with a pair of diverging legs one of which includes an opening that receives the pin and the other of which has an adjustable force applying member thereon engageable with one of the shoulders for affixing the pin in the support structure both axially and rotationally.

1 Claim, 4 Drawing Figures

U.S. Patent    May 5, 1981    4,265,562
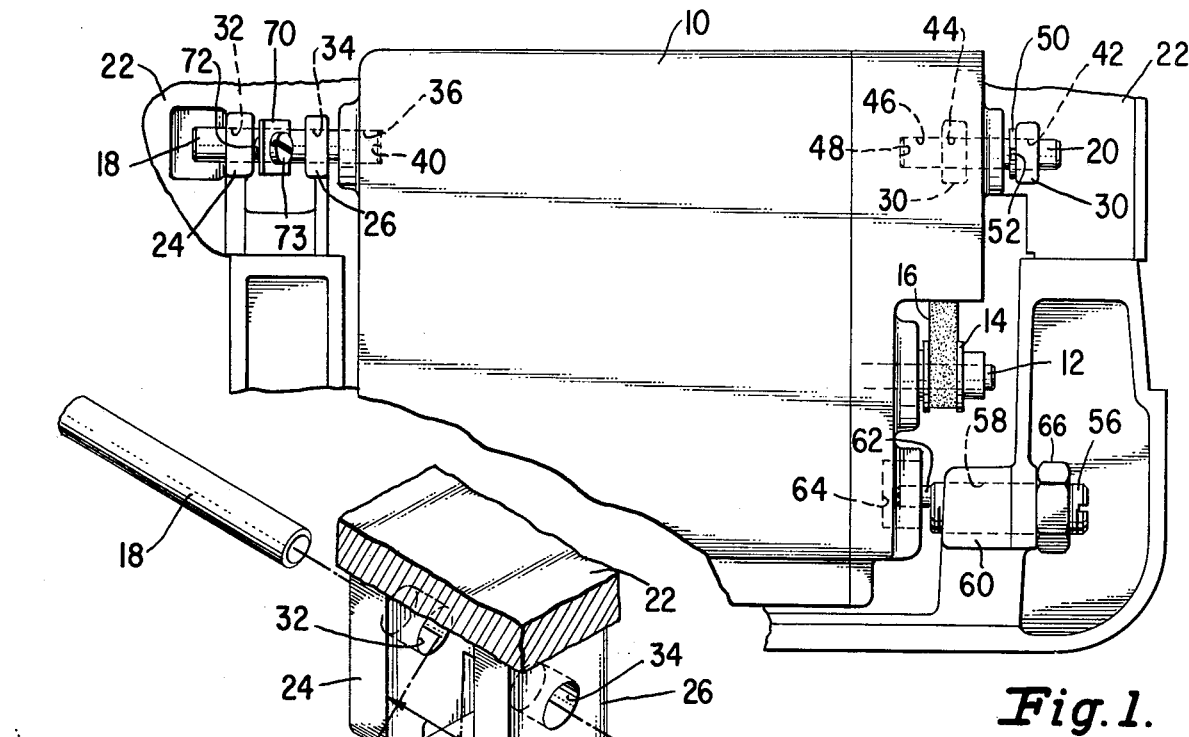
Fig.1.
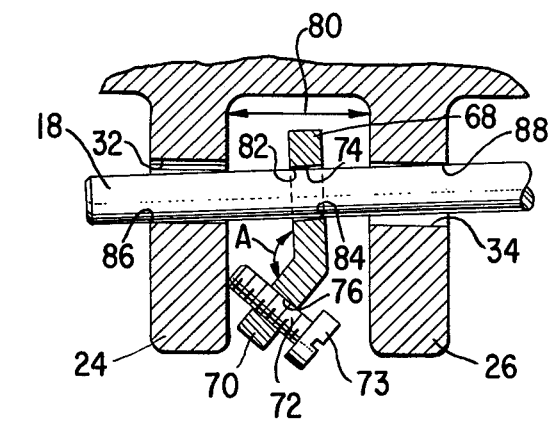
Fig. 4.
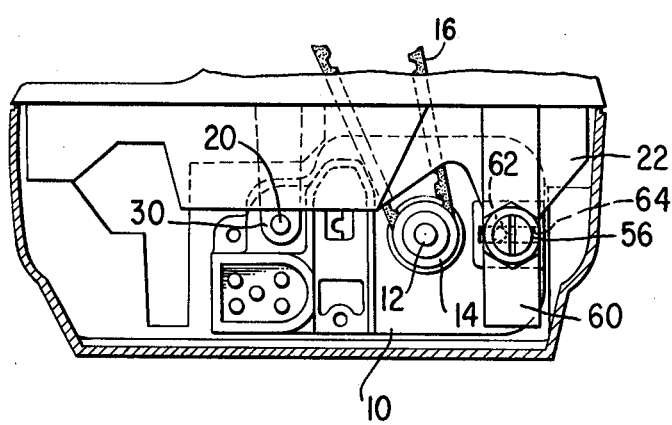
Fig. 3.
Fig. 2.

LOCKING DEVICE FOR MOUNTING PINS AND THE LIKE

DESCRIPTION

BACKGROUND OF THE INVENTION

1. Field of the Invention

The invention relates to locking devices for use in securing mounting pins and the like in defined positions in a support.

2. Description of the Prior Art

Small electric motors are commonly mounted on pins for pivotal movement enabling the position of the motor shaft to be adjusted and any belt driven by the motor shaft to be tightened when required. A motor mount providing for pivotal adjustment of a sewing machine motor on pins and the consequent adjustment of a belt driven thereby is shown, for example, in U.S. Pat. No. 3,739,735 for "Electric Motor Mount For Sewing Machines" of William L. Herron and Kenneth D. Adams issued June 19, 1973, and assigned to The Singer Company. Heretofore, pins used in a motor mount to enable pivotal adjusting movements of the motor have been secured in supporting structure in various ways, as by means of spring clips, collars and set screws. However, the securing means have generally proved to be unreliable or too costly to justify their use in highly competitive consumer products.

SUMMARY OF THE INVENTION

In accordance with the invention, a mounting pin for a motor or the like is provided with an inexpensive and easily manufactured locking device by means of which the pin may be reliably secured in a fixed position in the shoulders of a support. The locking device is formed with diverging legs, one of which has an opening that receives a pin and the other of which has an adjustable force applying member thereon engageable with one of the shoulders of the support for cocking the said one leg of the locking device on the pin and the pin in the shoulders of the support to thereby fix the position of the pin axially and rotationally in the support.

DESCRIPTION OF THE DRAWINGS

FIG. 1 is a plan view, partially in section, showing a motor mount including a pin locking device according to the invention;

FIG. 2 is a fragmentary end view showing part of the motor mount of FIG. 1;

FIG. 3 is an enlarged exploded perspective view showing the locking device of the invention; and FIG. 4 is an enlarged longitudinal sectional view illustrating the manner in which a locking device according to the invention secures a pin in support structure.

DESCRIPTION OF THE PREFERRED EMBODIMENT

Referring to FIG. 1 of the drawings, reference character 10 designates the housing of an electric motor having an output shaft 12 to which a pulley 14 that drives a belt 16 is attached. The motor housing is mounted on aligned pins 18 and 20 which are held in a support 22 including parallel depending shoulders 24, 26, 28 and 30. Pin 18 extends through aligned openings 32 and 34 in shoulders 24 and 26 respectively and into a pin receiving hole 36 in the motor housing where it abuts against a dead end 40 of the hole 36. The other pin 20 extends through aligned openings 42 and 44 in shoulders 28 and 30 respectively and into a pin receiving hole 46 in the motor housing to abut against a dead end 48 of the hole 46.

A snap-ring 50 in a groove 52 on pin 20 and a locking device 54 constructed in accordance with the invention define a fixed axial position for the pins 18 and 20, and the motor in support 22, the defined axial position of the motor being such as to dispose pulley 14 in alignment with another pulley (not shown) which is to be driven by the belt 16. However, the motor can be pivotally moved about the pins 18 and 20 to adjust the tightness of belt 16 by turning a threaded stud 56 located in a bore 58 in a lug 60 in support 22 and carrying thereon an eccentrically disposed crank pin 62 that extends into a guideway 64 formed in the motor housing 38. When the motor has been pivotally adjusted to provide a desired degree of tightness in belt 16, a lock nut 66 on stud 56 is tightened to secure the motor in place.

Locking device 54 includes a pair of legs 68 and 70 which diverge at an obtuse angle A, and a force applying member shown as a screw 72. Leg 68 includes an opening 74 through which the pin 18 extends and leg 70 includes a threaded bore 76 wherein the screw 72 is constrained. As shown, locking device 54 is located in a well 80 between the shoulders 24 and 26 of support 22 with the tip of screw 72 in engagement with shoulder 24. The angled shape of the locking device disposes the screw 72 so as to provide for ready accessibility to the screw head 73 with a screwdriver.

Locking device 54 fixes the position of pin 18 by applying tilting force to the pin. The locking device is rendered effective by tightening screw 72 against shoulder 24 to tilt the locking device on pin 18 and the pin 18 in the openings 32 and 34 in shoulders 24 and 26 as clearly shown in a greatly exaggerated manner in FIG. 4. The tightening adjustment of screw 72 by tilting locking device 54 and pin 18 causes leg 68 of the locking device at 82 and 84 along the edges of opening 74 to dig into the pin 18, and results in the shoulders 24 and 26 at 86 and 88 along the edges of openings 32 and 34 also digging into the pin. Lateral movement of the pin 18 and the motor housing 10 to the left as viewed in the drawings is thereby prevented since any tendency of the pin to so move only increases pressure at 82, 84, 86 and 88. Rotational movement of the pin 18 is also prevented by reason of the enforced contact of the locking device screw 72 with shoulder 24, locking device arm 68 with the pin in opening 74, and the pin with the shoulders 24 and 26 in openings 32 and 24.

The locking device 54 of the invention avoids the need for accurate machining of the openings 32 and 34 in shoulders 24 and 26, of the opening 74 in leg 68 of the locking device, and of the pin 18 since the locking device serves its purpose with only a loose fit between the pin and locking device arm, and between the pin and shoulders through which it extends. The legs of the locking device would normally be formed of a material sufficiently thin to permit opening 74 to be inexpensively formed on a punch press with a suitable degree of accuracy.

While the locking device 54 has been shown and described in the environment of a motor mount, it is not so limited in use. The device can be used to advantage in many environments where it is desired to axially and/or rotationally restrain a mounting pin, shaft or the like. Further, it should be understood that the present disclosure relates to only a preferred structural arrangement of the invention and should not be construed as a limitation thereof. Numerous alterations and modifications of the structure herein disclosed will suggest themselves to those skilled in the art, and all such modifications, and alterations which do not depart from the spirit and scope of the invention are intended to be included within the scope of the appended claims.

I claim:

1. In combination, a pin, a support for the pin including parallel shoulders defining a well therebetween and having aligned holes therein wherein the pin is received, and a locking device for the pin located in said well, the locking device including one leg with an opening through which the pin extends, and another leg disposed at an angle to the said one leg, the locking device also including an adjustable force applying screw extending through a threaded hole in said another leg and engageable at one end with one of the shoulders of the support for tilting the said one leg on the pin and the pin in the openings in the shoulder of the support to thereby affix the pin axially and rotationally in the support, the other end of the screw being separated from the walls and accessible from outside the well.

* * * * *